Patented Dec. 22, 1925.

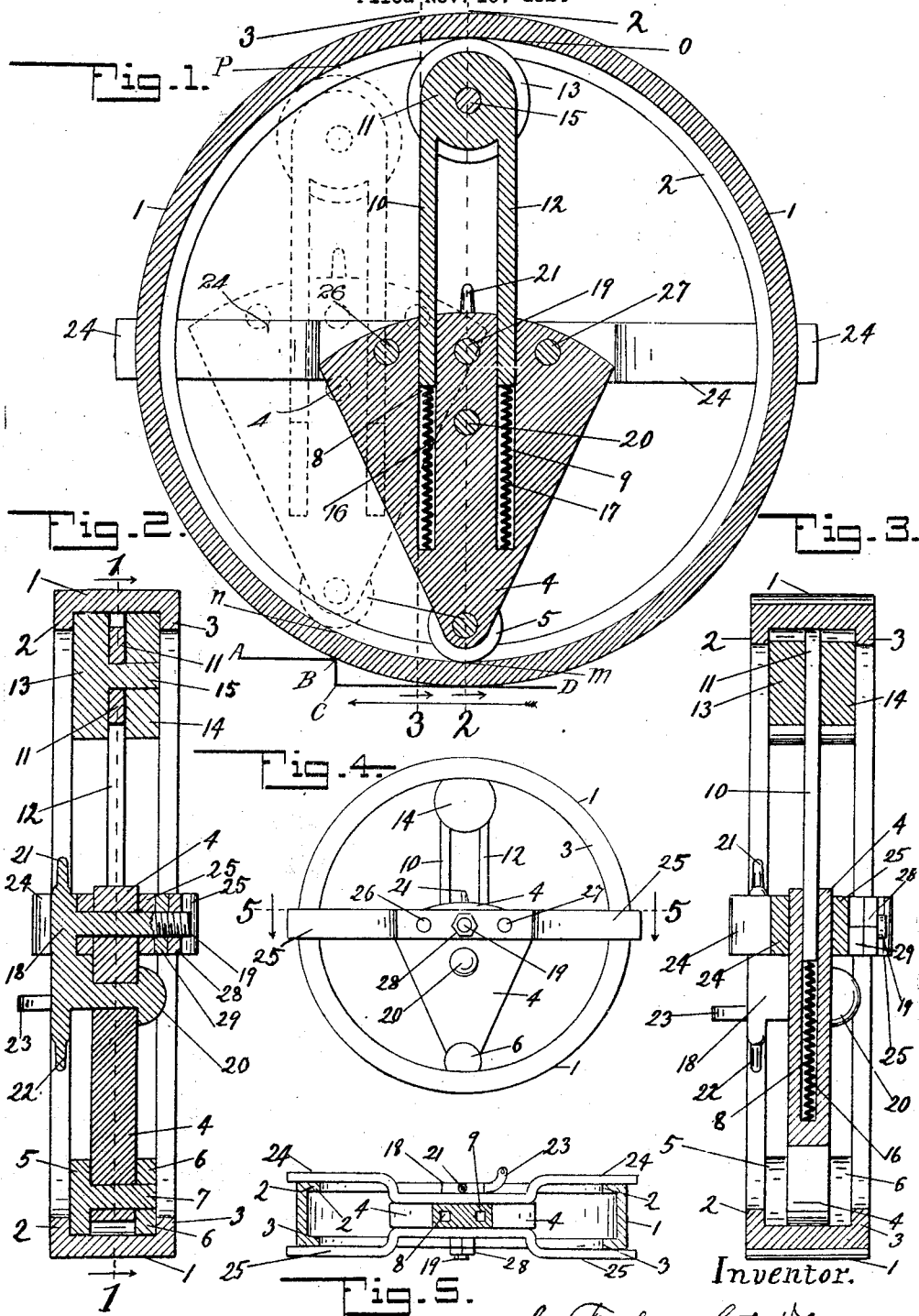

1,566,467

UNITED STATES PATENT OFFICE.

SERGIO FAUSTINO DE CASTRO É IZNAGA, OF HABANA, CUBA.

WHEEL WITHOUT SPOKES.

Application filed November 10, 1924. Serial No. 748,964.

*To all whom it may concern:*

Be it known that I, SERGIO FAUSTINO DE CASTRO É IZNAGA, a citizen of the Republic of Cuba, residing at Habana, in the Province of Habana, in the Republic of Cuba, have invented a new and useful Wheel without Spokes, of which the following is a full, clear, and exact description.

This invention relates to wheels for cars and other vehicles, specially automobiles, and has for its object to provide a shock-absorber wheel and incidentally a puncture-proof tire.

The invention consists in the novel construction and combination of parts, as hereinafter described and defined in the appended claims.

Reference is to be had to the accompanying drawings forming a part of this specification, in which similar characters of reference indicate corresponding parts throughout the several views.

Fig. 1 is a sectional side view of a front wheel, substantially on the line 1—1 in Fig. 2; Fig. 2 is a sectional view substantially on the line 2—2 in Fig. 1; Fig. 3 is a sectional view, substantially on the line 3—3 in Fig. 1; Fig. 4 is a reduced side view of a front wheel showing its outer guard-plate; Fig. 5 is a sectional plan view, substantially on the line 5—5 in Fig. 4.

In the drawings, 1 represents a tire for a front wheel provided with two lateral inward flanges 2 and 3.

4 is a sector-shaped stand provided with two anti-friction rolls 5 and 6 united by an axle 7 which may roll on the lower portion of the inner face of the tire 1 encased within its lateral flanges 2 and 3.

The stand 4 is provided with two vertical bores 8 and 9 adapted to receive the ends of the legs 10 and 12 of a forked-piece 10—11—12 which carries two anti-friction rollers 13 and 14 united by an axle 15 and which may roll bearing against the upper portion of the inner face of the tire 1 encased within its lateral flanges 2 and 3.

Two coil-springs 16 and 17 bearing against the bottom of the bores 8 and 9 and the ends of the legs 10 and 12 are what cause the forked-piece 10—11—12 to push the anti-friction rollers 13 and 14 against the upper portion of the inner face of the tire 1.

The stand 4 together with the forked-piece 10—11—12 and the coil-springs 16 and 17 constitute a contractible body.

18 is a piece secured to the stand 4 by two spikes 19 and 20 which are integral with said piece 18. The end of the spike 20 may be clenched in order to hold fast the piece 18 to the stand 4, but the end of the other spike 19 must be die-stocked so that it can secure a guard-plate by nuts as will be hereinafter explained.

The piece 18 is provided with two vertical spindles, one upward, 21, and the other one downward, 22, both intended to be journally mounted in the usual bearing attached to the front axle of a car.

23 is an arm projecting from the piece 18 and intended to be connected to the steering mechanism of a car.

24 and 25 are two guard-plates respectively attached by their middle portion to the inner and outer sides of the stand 4 to which they are secured by the spikes 26, 19, and 27 and the nuts 28 and 29. These guard-plates are intended to avoid any possible falling off of the tire 1 when the car is turning sharply.

As seen, this is a wheel without spokes whose tire can turn around the ends of its vertical diameter $mo$, as shown.

When a front wheel is rolling on an even ground D—C in the direction marked by the large arrow, Fig. 1, the contractible body formed by the stand 4 and the forked-piece 10—11—12 fills the vertical diameter $mo$, but when the wheel meets an obstacle C—B—A on its way the tire 1 stops momentarily before climbing up the obstacle and then as the car continues moving forward drawn by its momentum the lower rolls climb up the easy slope rolling smoothly from the point $m$ to the point $n$ on the lower portion of the inner face of the tire 1 while the upper rolls roll from the point $o$ to the point $p$ bearing against the upper portion of the inner face of the tire 1 assuming the contractible body the position on the chord $pn$. Then when the weight of the car is shifted to the point $n$ the tire rises rolling up the obstacle C—B—A, the coil-spring bearing against the ends of the legs of the forked-piece react and cause the device to pass back from the position on the chord $pn$ to the position X Z on the vertical diameter $mo$, thus absorbing the shock.

On the other hand, if the wheel when rolling on an even ground as from A to B, meets a dip hole B—C—D the tire 1 falls rolling down into said hole with accelerating motion and when it reaches the bottom stops momentarily and it would cause a shock but for the contraction of the contractible body which will climb up the inner face of the tire following the direction of the motion of the car thus absorbing the shock.

Having thus described by invention what I claim as new and desire to secure by Letters Patent is:—

1. In a wheel without spokes for vehicles, a loose circular tire made of any suitable hard material, provided with lateral inward flanges; in combination with a contractible body embodying a sector-shaped stand provided with anti-friction rollers which may roll on the lower portion of the inner face of said circular tire encased within its lateral flanges.

2. In a wheel without spokes for vehicles, a loose circular tire provided with lateral inward flanges, a sector-shaped stand provided with anti-friction rollers which may roll on the lower portion of the inner face of the said circular tire encased within its lateral inward flanges in combination with a forked-piece provided with anti-friction rollers which may roll bearing against the upper portion of the inner face of the said circular tire encased within its lateral inward flanges.

3. In a wheel without spokes for vehicles, a loose circular tire provided with lateral inward flanges, a contractible body embodying a sector-shaped stand provided with anti-friction rollers which may roll on the lower portion of the inner face of the said circular tire, and a forked piece provided with anti-friction rollers which may roll bearing against the upper portion of the inner face of the said circular tire encased within its lateral flanges; in combination with spring means bearing against the bottom of proper vertical bores made in the said stand and against the end of the legs of the forked-piece that enter into said bores.

4. In a wheel without spokes for vehicles, a loose circular tire provided with lateral inward flanges, a contractible body embodying a sector-shaped stand provided with anti-friction rollers which may roll on the lower portion of the inner face of the said circular tire encased within its lateral flanges, and a forked-piece provided with anti-friction rollers which may roll bearing against the upper portion of the said circular tire encased within its lateral flanges, spring means within proper vertical bores made in the said stand bearing against the bottom of said bores and the ends of the legs of the forked-piece; in combination the afore-said stand with a piece bearing an upward and a downward spindle adapted to be journally mounted in the usual bearings attached to the front axle, and a projecting arm intended to be connected to the steering mechanism of a car.

5. In a wheel without spokes for vehicles, a loose circular tire provided with lateral inward flanges, a contractible body embodying a sector-shaped stand provided with anti-friction rollers which may roll on the lower portion of the inner face of the said circular tire and a forked-piece provided with anti-friction rollers which may roll bearing against the upper portion of the inner face of the said circular tire encased within its lateral flanges, spring means within proper bores made in said stand and bearing against the bottom of said bores and the ends of the legs of the forked-piece; in combination with two horizontal guard-plates secured by their middle portion respectively to the outer and the inner faces of the said sector-shaped stand embracing between them the said loose circular tire to avoid its possible falling off when the car turns sharply.

SERGIO FAUSTINO de CASTRO é IZNAGA.